(12) United States Patent
Lu et al.

(10) Patent No.: US 9,830,018 B2
(45) Date of Patent: Nov. 28, 2017

(54) TOUCH CONTROL APPARATUS AND NOISE COMPENSATING CIRCUIT AND METHOD THEREOF

(71) Applicant: Industrial Technology Research Institute, Hsinchu (TW)

(72) Inventors: Yi-Chuan Lu, Kinmen County (TW); Chang-Po Chao, Taipei (TW); Chang-Xian Wu, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 219 days.

(21) Appl. No.: 14/983,584

(22) Filed: Dec. 30, 2015

(65) Prior Publication Data

US 2017/0131838 A1 May 11, 2017

(30) Foreign Application Priority Data

Nov. 6, 2015 (TW) .............................. 104136606 A

(51) Int. Cl.
*G06F 3/041* (2006.01)
*G06F 3/044* (2006.01)
*G06F 3/047* (2006.01)

(52) U.S. Cl.
CPC ............ *G06F 3/0418* (2013.01); *G06F 3/044* (2013.01); *G06F 3/047* (2013.01); *G06F 3/0412* (2013.01)

(58) Field of Classification Search
CPC ........... G06F 3/044; G06F 2203/04104; G06F 3/0412
See application file for complete search history.

(56) References Cited

U.S. PATENT DOCUMENTS 8,305,360 B2 11/2012 Wu
8,411,066 B2 4/2013 Cordeiro et al.
(Continued)

FOREIGN PATENT DOCUMENTS

CN 101673163 3/2010
CN 101937662 A 1/2011
(Continued)

OTHER PUBLICATIONS

Ik-Seok Yang, et al., "A Touch Controller Using Differential Sensing Method for On-Cell Capacitive Touch Screen Panel Systems," IEEE Transactions on Consumer Electronics, vol. 57, Issue3, Aug. 2011, pp. 1027-1032.
(Continued)

*Primary Examiner* — Gerald Johnson
(74) *Attorney, Agent, or Firm* — JCIPRNET

(57) ABSTRACT

The disclosure provides a touch control apparatus and noise compensation circuit and method thereof. The noise compensation circuit includes an integration circuit, a noise storage circuit, and a noise detection circuit. The noise detection circuit receives a plurality of continuous touch detection signals, and compares the touch detection signals with a first and second threshold values to generate a plurality of detection results. The noise detection circuit sets a plurality of noise signals to be saved in the noise storage circuit or transmits a plurality of effective signals to the integration circuit based on the detection results. The noise storage circuit generates an average noise within a time period based on the noise signals and transmits the average noise to the integration circuit. The integration circuit generates a touch detection result according to the effective signals and the average noise.

20 Claims, 6 Drawing Sheets

(56) References Cited

U.S. PATENT DOCUMENTS

| | | |
|---|---|---|
| 8,508,503 B2 | 8/2013 | Lin et al. |
| 8,982,093 B2 | 3/2015 | Wei et al. |
| 2013/0141139 A1 | 6/2013 | Ballan et al. |
| 2013/0176233 A1 | 7/2013 | Lin et al. |
| 2013/0222338 A1* | 8/2013 | Gim .................. G06F 3/041 345/174 |
| 2013/0265242 A1 | 10/2013 | Richards et al. |
| 2015/0268796 A1* | 9/2015 | Tsuyuzaki ............ G06F 3/0418 345/174 |
| 2015/0277607 A1* | 10/2015 | Kosugi ................ G06F 3/0416 345/173 |
| 2015/0277659 A1* | 10/2015 | Lu ..................... G06F 3/0418 345/173 |
| 2016/0357346 A1* | 12/2016 | Tokita .................. G06F 3/0412 |

FOREIGN PATENT DOCUMENTS

| | | |
|---|---|---|
| CN | 104156096 A | 11/2014 |
| TW | 201350800 A | 12/2013 |
| TW | I438413 | 5/2014 |
| TW | 201433948 A | 9/2014 |
| TW | 201506750 A | 2/2015 |
| TW | I472165 | 2/2015 |
| WO | 2014196188 A1 | 12/2014 |

OTHER PUBLICATIONS

Yeong-Shin Jang, et al., "A 45 dB, 150 Hz and 18 mW Touch Controller for On-Cell Capacitive TSP Systems," IEEE Transactions on Circuits and Systems II: Express Briefs, vol. 61, Issue 10, Aug. 5, 2014, pp. 748-752.

Jun-Hyeok Yang, et al., "A Highly Noise-Immune Touch Controller Using Filtered-Delta-Integration and a Charge-Interpolation Technique for 10.1-inch Capacitive Touch-Screen Panels," 2013 IEEE International Solid-State Circuits Conference Digest of Technical Papers (ISSCC), Feb. 17-21, 2013, pp. 390-391.

"Office Action of Taiwan Counterpart Application", dated Aug. 23, 2016, p. 1-p. 11.

* cited by examiner

TOUCH CONTROL APPARATUS AND NOISE COMPENSATING CIRCUIT AND METHOD THEREOF

CROSS-REFERENCE TO RELATED APPLICATION

This application claims the priority benefit of Taiwan application serial no. 104136606, filed on Nov. 6, 2015. The entirety of the above-mentioned patent application is hereby incorporated by reference herein and made a part of specification.

TECHNICAL FIELD

The disclosure is directed to a noise compensation circuit and a noise compensation method of an on-cell touch panel.

BACKGROUND

With the progress of electronic technologies, electronic products have become an essential tool in people's lives. Moreover, in order to provide user-friendly interfaces, providing the electronic products with touch control display panels having a touch control capability has become an essential trend.

In the current technical field, the touch panels include two types, a plug-in and a non-plug-in types. The non-plug-in type touch panels can be classified into on-cell and in-cell touch panels. In an on-cell touch panel, driving electrodes and sensing electrodes of the touch panel are disposed on a surface of a display panel.

In an in-cell touch panel, a touch sensor is directly installed in the display structure. In the on-cell touch panel technique, the touch panel is easily interfered by noise from the display thereunder, which leads to detection errors of touched points. Especially, as a thickness of a touch control display panel (e.g., an active array organic light emitting diode (AMOLED) display panel combined with a touch panel) becomes thinner, e.g., reaches a level smaller than 100 μm, upper electrodes of the AMOLED display panel have more and more significant influence on an induced electric field, and such poor induction cases often happen. Additionally, as a self-capacitance of the on-cell touch panel rises up, a ratio of a mutual-capacitance to the self-capacitance is decreased to cause reduction in sensibility of the touch detection. Particularly, in a flexible display touch panel, an electrical inhomogeneity phenomenon caused by the panel being curved further influences the accuracy of detecting the touched points.

SUMMARY

The disclosure provides a noise compensation circuit and a noise compensation method for an on-cell touch panel, which can contribute to effectively mitigating the influence caused by noise on a touch panel and increasing sensing sensitivity of the on-cell touch panel.

The disclosure further provides a touch control apparatus which can contribute to effectively mitigating the influence caused by the noise on the touch panel and increasing sensing sensitivity of the on-cell touch panel through the noise compensation circuit.

The noise compensation circuit introduced by the disclosure includes an integration circuit, a noise storage circuit and a noise detection circuit. The noise storage circuit is coupled to the integration circuit. The noise detection circuit is coupled to the integration circuit and the noise storage circuit, receives a plurality of continuous touch detection signals and compares the touch detection signals with a first threshold value and a second threshold value, so as to respectively generate a plurality of detection results. The noise detection circuit sets multiple noise signals in the touch detection signals to be saved in the noise storage circuit or transmits multiple effective signals among the touch detection signals to the integration circuit based on the detection results. The noise storage circuit generates an average noise within a time period based on the noise signals and transmits the average noise to the integration circuit. The integration circuit generates a touch detection result according to the average noise and the effective signals.

The touch control apparatus introduced by the disclosure includes an on-cell touch panel and a noise compensation circuit. The on-cell touch panel includes a plurality of touch sensing lines and at least one reference signal line. The noise compensation circuit is coupled to the on-cell touch panel. The noise compensation circuit includes an integration circuit, a noise storage circuit and a noise detection circuit. The noise storage circuit is coupled to the integration circuit. The noise detection circuit is coupled to the integration circuit and the noise storage circuit, receives a plurality of continuous touch detection signals and compares the touch detection signals with a first threshold value and a second threshold value, so as to respectively generate a plurality of detection results. The noise detection circuit sets multiple noise signals among the touch detection signals to be saved in the noise storage circuit or transmits multiple effective signals among the touch detection signals to the integration circuit based on the detection results. The noise storage circuit generates an average noise within a time period based on the saved noise signals and transmits the average noise to the integration circuit, and the integration circuit generates a touch detection result according to the average noise and the effective signals.

The noise compensation method of the on-cell touch panel introduced by the disclosure includes: receiving a plurality of continuous touch detection signals; comparing the touch detection signals with a first threshold value and a second threshold value, so as to respectively generate a plurality of detection results; determining multiple noise signals and multiple effective signals among the touch detection signals according to the detection results; setting the noise signals to be saved and generating an average noise based on the saved noise signals within a time period; and generating a touch detection result based on the average noise and the effective signals.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
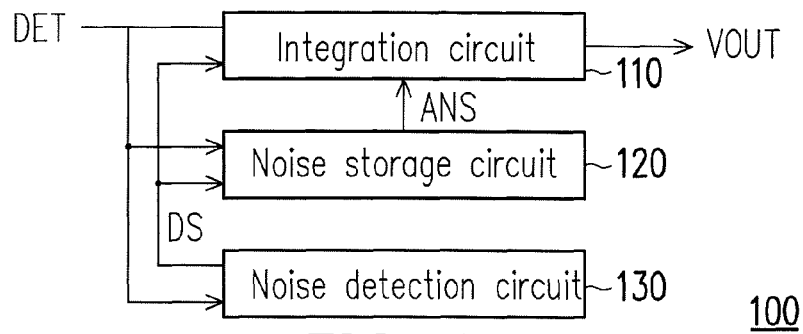
FIG. 1 is a schematic diagram illustrating a noise compensation circuit according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1 hereinafter, FIG. 1 is a schematic diagram illustrating a noise compensation circuit according to an embodiment of the disclosure. In the present embodiment, a noise compensation circuit 100 includes an integration circuit 110, a noise storage circuit 120 and a noise detection circuit 130. The noise storage circuit 120 is coupled to the integration circuit 110, and the noise detection circuit 130 is coupled to the integration circuit 110 and the noise storage circuit 120. The integration circuit 110, the noise storage circuit 120 and the noise detection circuit 130 receive a plurality of continuous touch detection signals DET, and the noise detection circuit 130 sets the touch detection signals DET to be compared with a first threshold value and a second threshold value, so as to respectively generate a plurality of detection results DS. The noise detection circuit 130 then determines to transmits a plurality of noise signals in the touch detection signals DET to the noise storage circuit 120, or to transmit a plurality of effective signals in the touch detection signals to the integration circuit 110 according to the generated detection results DS. Therein, the first threshold value is greater than the second threshold value.

As for operation details, when determining that a value of each of the touch detection signals DET is greater than the first threshold value or less than the second threshold value, the noise detection circuit 130 determines that the determined touch detection signals DET are the noise signals. In contrast, when determining that the value of each of the touch detection signals DET falls between the first threshold value and the second threshold value, the noise detection circuit 130 determines that the determined touch detection signals DET are the effective signals. On the other hand, the noise detection circuit 130 may generate the detection results DS according to the aforementioned determination and transmit the detection results DS to the integration circuit 110 and the noise storage circuit 120.

When a detection result DS indicates that a corresponding touch detection signal DET is a noise signals, the corresponding touch detection signal DET is received by the noise storage circuit 120, but not by the integration circuit 110. In contrast, when the detection result DS indicates that the corresponding touch detection signal DET is an effective signal, the corresponding touch detection signal DET is not received by the noise storage circuit 120, but received by the integration circuit 110. It should be mentioned that in a time period, the noise storage circuit 120 may receive a plurality of touch detection signals DET that are determined as the noise signals, and the noise storage circuit 120 may generate an average noise ANS according to the saved touch detection signals DET at a time point of the end of the time period and transmit the average noise ANS to the integration circuit 110.

Namely, in the present embodiment, the integration circuit 110 receives not only the touch detection signals DET that are determined as the effective signals, but also the average noise ANS. Additionally, the integration circuit 110 generates a touch detection result VOUT according to the touch detection signal DET determined as the effective signals and the average noise ANS, so as to mitigate the influence caused by the noise on the detection operations.

The first threshold value and the second threshold value described above are predetermined values, and when a value of a touch detection signal DET is too big (i.e., over the first threshold value) or too small (i.e., lower than the second threshold value), it indicates that the value of the touch detection signal DET is an unreasonable value generated due to the interference by the noise, which is not adaptive to be transmitted directly to the integration circuit 110 for the calculation of the touch detection result VOUT. However, the touch detection signals DET that are determined as the noise signals may contain effective touch information and are not adapted to be discarded. Thus, in the present embodiment, those touch detection signals DET are transmitted to the noise storage circuit 120, such that the noise storage circuit 120 calculates the average noise ANS for calculating the touch detection result VOUT.

Figure 2:
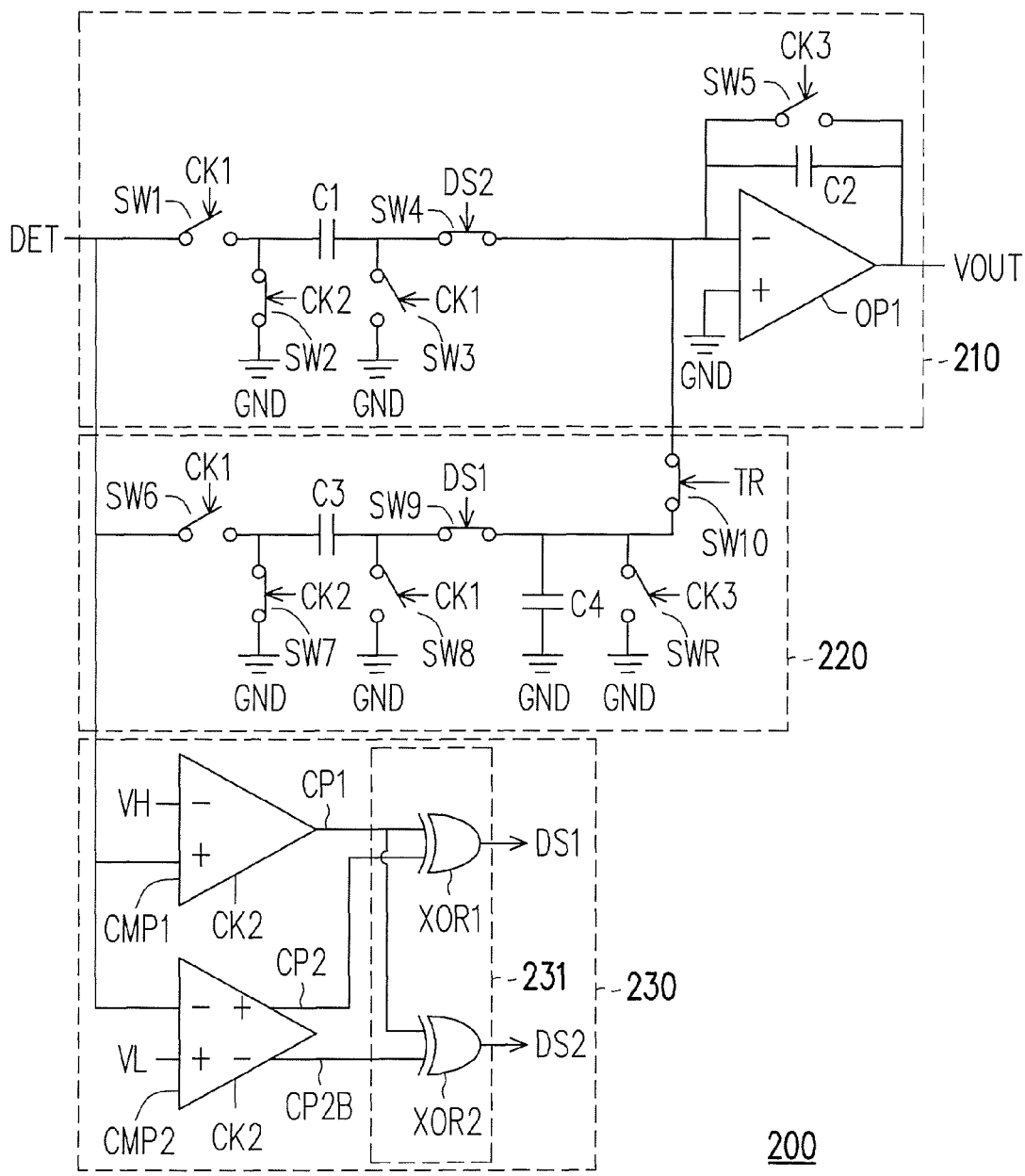
FIG. 2 is a schematic diagram illustrating a noise compensation circuit according to another embodiment of the disclosure.

Referring to FIG. 2 hereinafter, FIG. 2 is a schematic diagram illustrating a noise compensation circuit according to another embodiment of the disclosure. In the present embodiment, a noise compensation circuit 200 includes an integration circuit 210, a noise storage circuit 220 and a noise detection circuit 230. The integration circuit 210 receives a plurality of continuously generated touch detection signals DET. The integration circuit 210 includes an operational amplifier OP1, a capacitor C2, a switch SW5 and a switched capacitor circuit formed by switches SW1 to SW4 and a capacitor C1. The capacitor C2 is connected between a negative input terminal and an output terminal of the operational amplifier OP1, and the switch SW5 is connected between the negative input terminal and the output terminal of the operational amplifier OP1 and is coupled in parallel to the capacitor C2. The switch SW5 is controlled by a clock signal CK3. A positive input terminal of the operational amplifier OP1 is coupled to a reference ground terminal GND.

As for the switched capacitor circuit, a first terminal of the switch SW1 receives the touch detection signals DET, and the switch SW1 is controlled by a clock signal CK1. A first terminal of the switch SW2 is coupled to a second terminal of the switch SW1, a second terminal of the switch SW2 is coupled to a reference ground terminal GND, and the switch SW2 is controlled by a clock signal CK2. A first terminal of the capacitor C1 is coupled to the first terminal of the switch SW2. A first terminal of the switch SW3 is coupled to a second terminal of the capacitor C1, a second terminal of the switch SW3 is coupled to the reference ground terminal GND, and the switch SW3 is controlled by the clock signal CK1. A first terminal of the switch SW4 is coupled to the second terminal of the capacitor C1, and the switch SW4 is controlled by a detection result DS2.

The aforementioned clock signals CK1 and CK2 have the same frequency and are totally complementary to each other without overlapping with each other. The clock signal CK3 is configured to control the integration circuit 210 whether to perform an output operation on the touch detection result VOUT. A frequency of the clock signal CK3 is much lower than the frequency of the clock signals CK1 and CK2.

It should be noted that in the present embodiment, the switch SW4 is turned on or turned off based on the detection result DS2. Namely, when the received touch detection signal DET is an effective signal, the switch SW4 is turned on based on the detection result DS2, and the touch detection signal DET is transmitted to a negative input terminal of the operational amplifier OP1 through the switched capacitor circuit. In contrast, when the received touch detection signal DET is a noise signal, the switch SW4 is turned off based on the detection result DS2, and the touch detection signal DET is not transmitted to a negative input terminal of the operational amplifier OP1 through the switched capacitor circuit.

As for the noise storage circuit 220, the noise storage circuit 220 includes switches SW6-SW10, a reset switch SWR and capacitors C3 and C4. A first terminal of the switch SW6 receives the touch detection signals DET and is controlled by the clock signal CK1. A first terminal of the switch SW7 is coupled to a second terminal of the switch SW6, a second terminal of the switch SW7 is coupled to the reference ground terminal GND, and the switch SW7 is controlled by the clock signal CK2. A first terminal of the capacitor C3 is coupled to the first terminal of the switch SW7. A first terminal of the switch SW8 is coupled to a second terminal of the capacitor C3, and a second terminal of the switch SW8 is coupled to the reference ground terminal GND. A first terminal of the switch SW9 is coupled to the second terminal of the capacitor C3, and the switch SW9 is controlled by a detection result DS1. The capacitor C4 is coupled between a second terminal of the switch SW9 and the reference ground terminal GND. A first terminal of the switch SW10 is coupled to the second terminal of the switch SW9, a second terminal of the switch SW10 is coupled to the integration circuit 210, and the switch SW10 is controlled by an average noise transmission signal TR.

The noise storage circuit 220 further includes a reset switch SWR. The reset switch SWR is coupled between the first terminal of the switch SW9 and the reference ground terminal GND and controlled by the clock signal CK3. The clock signal CK3 serves as a reset signal.

When the integration circuit 210 does not perform the generation operation on the touch detection result VOUT, the clock signal CK3 induces the switch SW5 and the reset switch SWR to be turned on. In this case, the touch detection result VOUT generated by the operational amplifier OP1 may be identical to a ground voltage of the reference ground terminal GND, and the capacitor C4 releases a charge saved therein to the reference ground terminal GND through the turned-on reset switch SWR. While the integration circuit 210 is performing the generation operation on the touch detection result VOUT, the clock signal CK3 induces the switch SW5 and the reset switch SWR to be turned off. In this case, the operational amplifier OP1 forms the integration circuit for performing an integrating operation on the received signal, and the capacitor C4 is available for saving the noise signal.

Additionally, the switch SW9 is controlled by the detection results DS1, and when the touch detection signal DET received by the noise storage circuit 220 is determined as a noise signal, the switch SW9 is turned on based on the detection result DS1, and the touch detection signal DET determined as the noise signal is set to be saved in the capacitor C4. In contrast, when the touch detection signal DET received by the noise storage circuit 220 is determined as the effective signal, the switch SW9 is turned off based on the detection result DS1. It can be understood that the capacitor C4 is capable of saving the noise signals having different voltage levels for multiple times within a time period and thereby, obtains the average noise.

On the other hand, the switch SW10 is turned on or turned off based on the average noise transmission signal TR. Meanwhile, when the time period of calculating the average noise ends, the switch SW10 is turned on based on the average noise transmission signal TR and transmits the average noise saved in the capacitor C4 to the negative input terminal of the operational amplifier OP1, based on which the operational amplifier OP1 generates the touch detection result VOUT.

In the present embodiment, the average noise transmission signal TR is generated based on the clock signal CK3, during a time period before the end of the integrating operation performed by the integration circuit 210, the average noise transmission signal TR may be provided to turn on the switch SW10.

Figure 3:
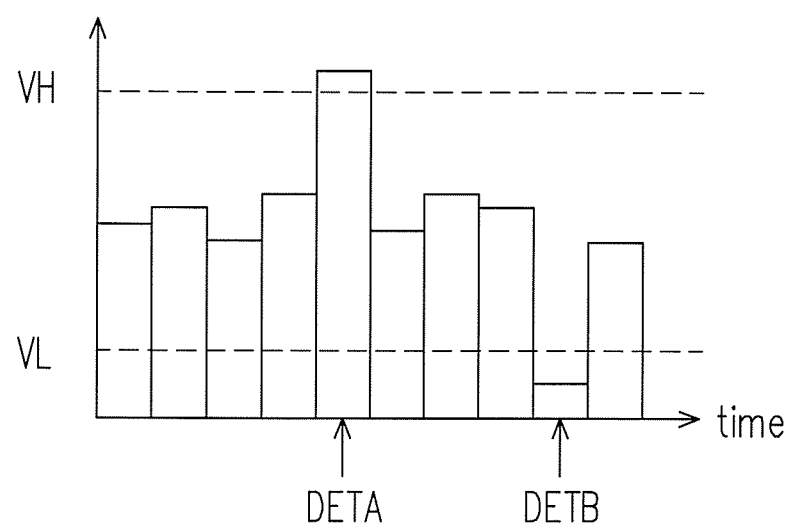
FIG. 3 is a schematic diagram illustrating the detection of the touch detection signals.

As for the noise detection circuit 230, referring to FIG. 3, FIG. 3 is a schematic diagram illustrating the detection of the touch detection signals. The noise detection circuit 230 determines whether the touch detection signal DET is a noise signal by detecting a voltage level of the touch detection signal DET and according to the relationship of a first and a second threshold values VH and VL. In FIG. 3, a voltage level of a touch detection signal DETA is greater than the first threshold value VH, and thus, the touch detection signal DETA is a noise signal. Besides, a voltage level of a touch detection signal DETB is less than the second threshold value VL, and thus, the touch detection signal DETB is also a noise signal. As for the rest, the touch detection signals with voltages levels falling between the first and the second threshold values VH and VL are effective signals.

Referring to FIG. 2 again, the noise detection circuit 230 includes comparators CMP1 and CMP2 and a logic operation circuit 231. The comparators CMP1 and CMP2 may be respectively formed by different operational amplifiers. The comparator CMP1 receives the touch detection signals DET and the first threshold value VH and compares the touch detection signals DET with the first threshold value VH, so as to respectively generate comparison results CP1. The comparator CMP2 receives the touch detection signals DET and the second threshold value VL and compares the touch detection signals DET with the second threshold value VL, so as to respectively generate comparison results CP2.

The logic operation circuit 231 is coupled to the comparators CMP1 and CMP2 and generates detection results DS1 and DS2 based on the detection results DS1 and DS2. In the present embodiment, the logic operation circuit 231 includes XOR gates XOR1 and XOR2. The XOR gate XOR1 receives the detection results DS1 and DS2 to generate the detection result DS1. The XOR gate XOR2 receives the comparison results CP1 and inverted comparison results CP2B to generate the detection result DS2. The inverted comparison results CP2B are inverted to the comparison results CP2.

To be detailed, when a touch detection signal DET is greater than the first threshold value VH, the touch detection signal DET is determined as a noise signal. Meanwhile, the comparator CMP1 generates a logic high comparison result CP1, and the comparator CMP2 generates a logic low comparison result CP2 (and a logic high comparison result CP2B). In this scenario, the XOR gate XOR1 generates a logic high detection result DS1, and the XOR gate XOR2 generates a logic low detection result DS2. Thus, the switch SW4 is turned off, the switch SW9 is turned on, and the touch detection signal DET determined as the noise signal is set to be saved in the capacitor C4.

When the touch detection signal DET is less than the second threshold value VL, the touch detection signal DET is also determined as the noise signal. Meanwhile, the comparator CMP1 generates the logic high comparison result CP1, and the comparator CMP2 generates the logic low comparison result CP2 (and the logic high comparison result CP2B). In this scenario, the XOR gate XOR1 generates a logic high detection result DS1, and the XOR gate XOR2 generates a logic low detection result DS2. Thus, the switch SW4 is turned off, the switch SW9 is turned on, and the touch detection signal DET determined as the noise signal is set to be saved in the capacitor C4.

Figure 4:
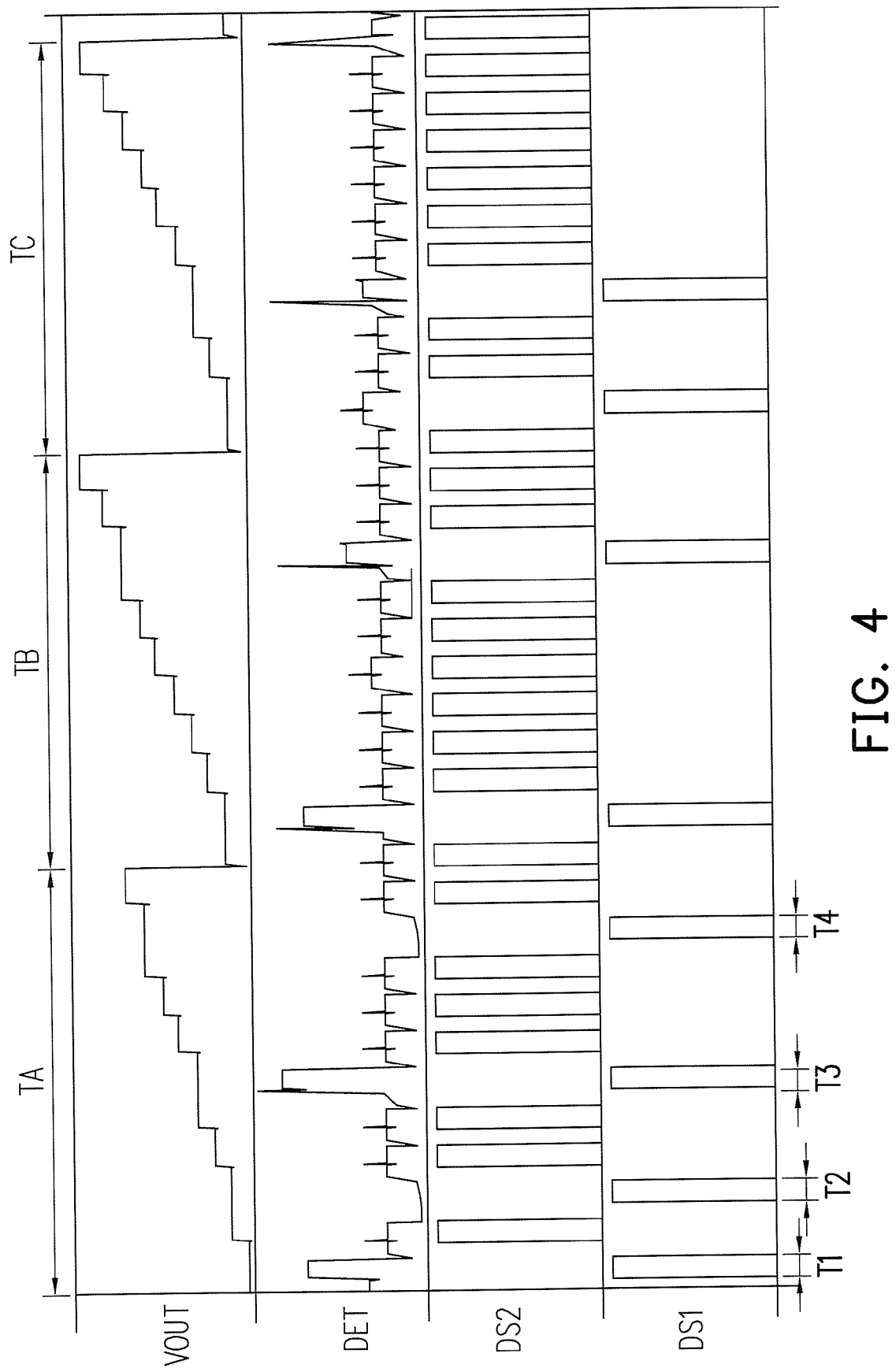
FIG. 4 is a waveform diagram illustrating the operation of the noise compensation circuit of the disclosure.

Referring to FIG. 4 hereinafter, FIG. 4 is a waveform diagram illustrating the operation of the noise compensation circuit of the disclosure. In FIG. 4, a touch detection operation is performed for multiple times within time periods TA, TB and TC, and a voltage level of the touch detection result VOUT rises with time based on the integrating operation of the integration circuit respectively in the time periods TA, TB and TC. The touch detection signals DET are compared with the first and the second threshold values to correspondingly generate the detection results DS1 and DS2. For instance, the voltage levels of the touch detection signals DET are greater than the first threshold value at time points T1 and T3, the voltage levels of the touch detection signals DET are less than the second threshold value at the time points T2 and T4, and thus, the touch detection signals DET corresponding to the time points T1-T4 are determined as noise signals. Therefore, the logic high detection results DS1 are generated at the time points T1-T4, while at other time points, the logic high detection results DS2 are generated, and the corresponding touch detection signals DET are indicated as the effective signals.

Figure 5A:
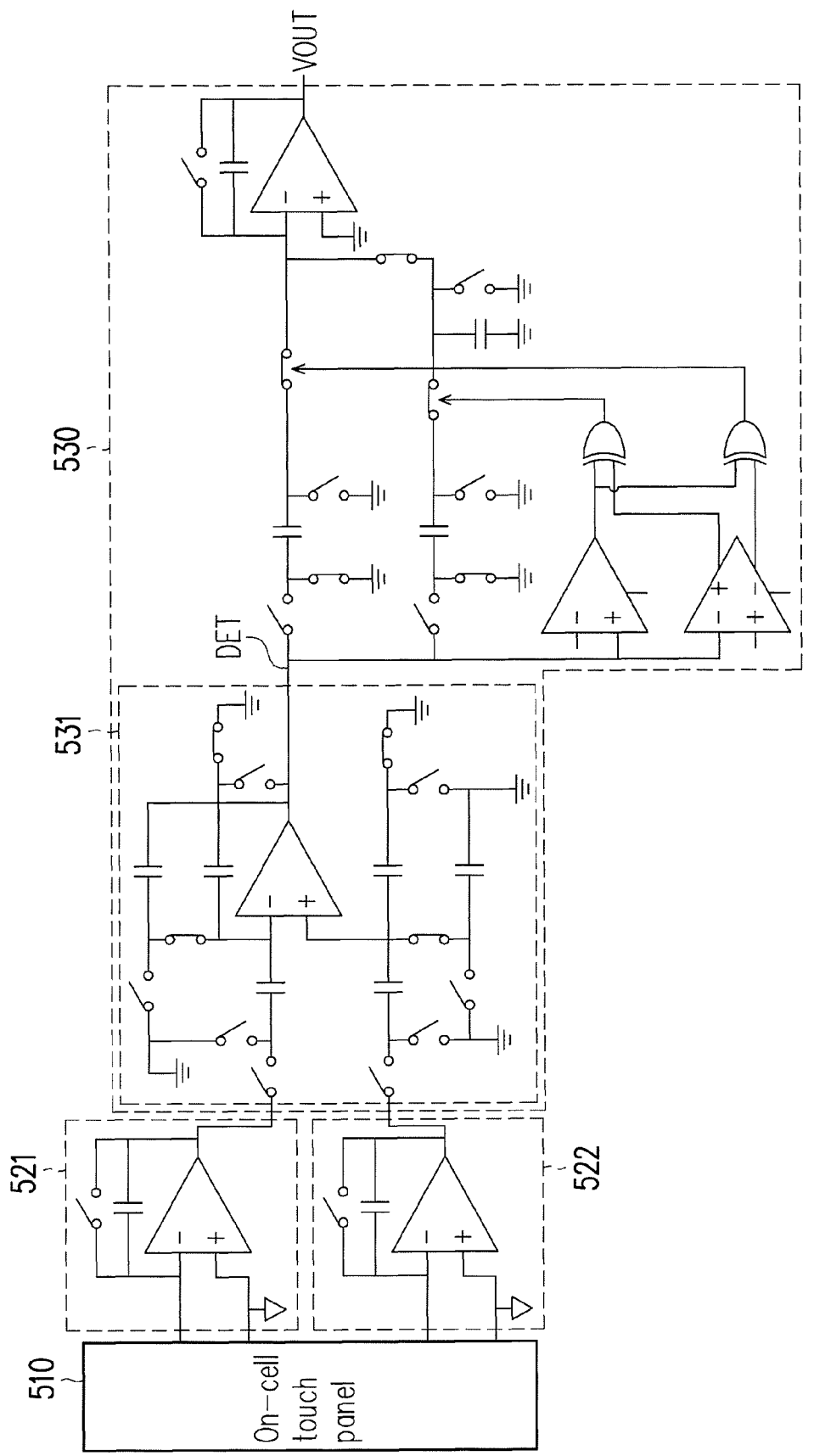
FIG. 5A is a schematic diagram illustrating a touch control apparatus according to another embodiment of the disclosure.

Referring to FIG. 5A, FIG. 5A is a schematic diagram illustrating a touch control apparatus according to an embodiment of the disclosure. In the present embodiment, a touch control apparatus 500 includes an on-cell touch panel 510, integration circuits 521, 522 and a noise compensation circuit 530. Each of the integration circuits 521 and 522 is coupled to one of a plurality of touch sensing lines and a reference signal line in the on-cell touch panel 510. The touch sensing lines are configured to transmit signals with respect to capacitance changes of touch sensing units on the on-cell touch panel 510, and the reference signal lines transmit reference signals with noise information. The integration circuits 521 and 522 respectively integrates the capacitance change signals transmitted by the touch sensing lines and the reference signals and respectively transmit integral results to the noise compensation circuit 530.

The noise compensation circuit 530 further includes a differential circuit 531. The differential circuit 531 receives the integral results generated by the integration circuits 521 and 522 and calculates an offset between the two integral results to generate the touch detection signal DET. On the basis that the touch sensing lines continuously transmit the capacitance change signals, the differential circuit 531 generates a plurality of continuous touch detection signals DET.

The circuits of the noise compensation circuit 530 other than the differential circuit 531 are the same as the circuits in the preceding embodiment illustrated in FIG. 2 and may perform the detection operation based on the plurality of continuous touch detection signals DET to correspondingly generate the touch detection result VOUT. Detailed operations may refer to the descriptions set forth in the embodiments above and thus, will not be repeated.

Figure 5B:
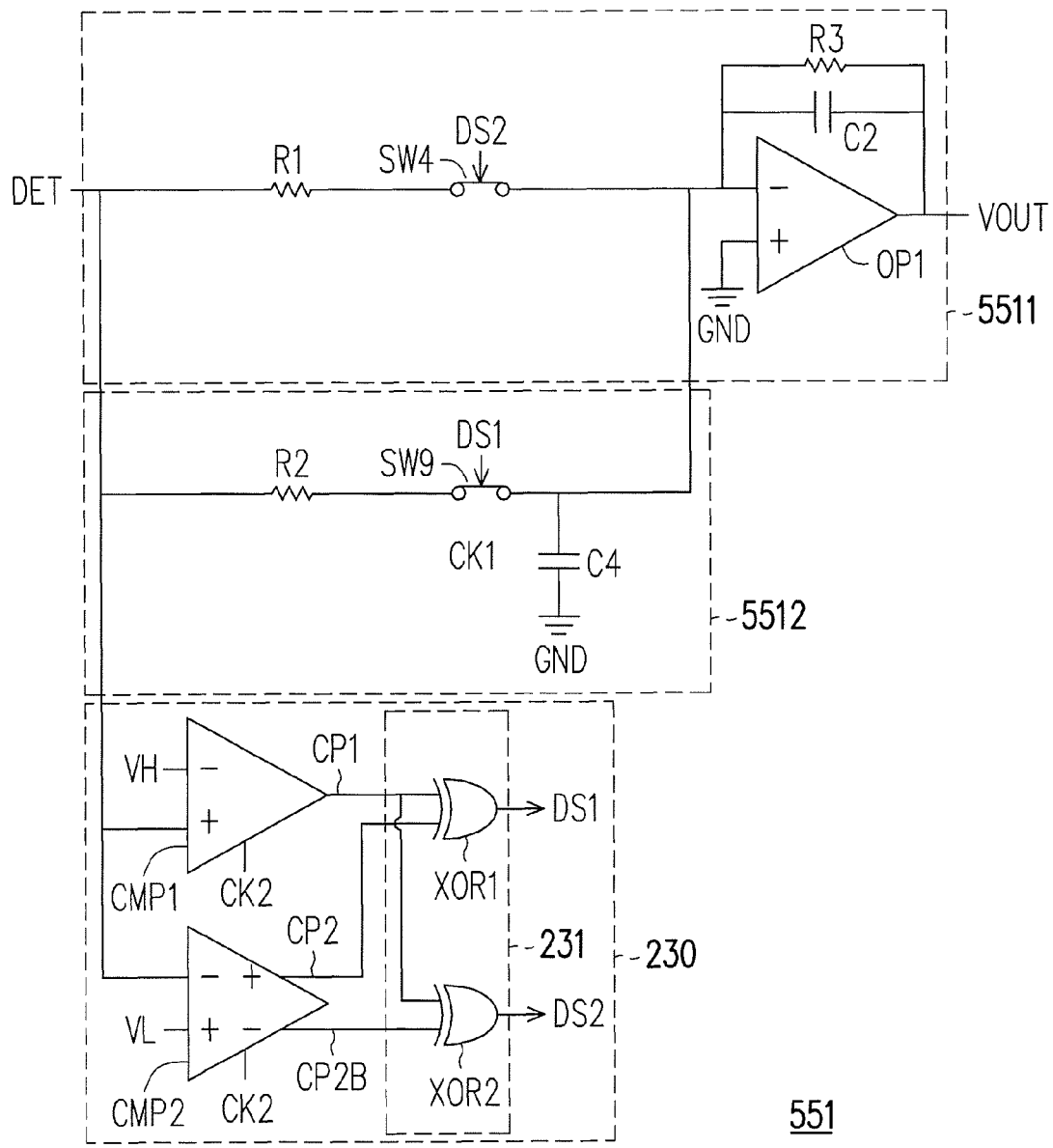
FIG. 5B is a schematic diagram illustrating a noise compensation circuit according to another embodiment of the disclosure.

Referring to FIG. 5B hereinafter, FIG. 5B is a schematic diagram illustrating a noise compensation circuit according to another embodiment of the disclosure. In FIG. 5B, an integration circuit 5511 and a noise storage circuit 5512 included in a noise compensation circuit 551 of the present embodiment is difference from those in the embodiment above. In the present embodiment, resistors R1, R2 and R3 are used in replacement with the switched capacitor circuit in the embodiment above, which may improve the capability for resisting the high-frequency noise. In detail, in the integration circuit 5511, a terminal of the resistor R1 receives a touch detection signal DET, the other terminal of the resistor R1 is coupled to a terminal of the switch SW4, and the other terminal of the switch SW4 is coupled to the negative input terminal of the operational amplifier OP1. The positive input terminal of the operational amplifier OP1 is coupled to the reference ground terminal GND, and the resistor R3 and the capacitor C2 are connected in parallel to each other and between the negative input terminal and the output terminal of the operational amplifier OP1. The switch SW4 is controlled by the detection result DS2 to be turned on or turned off.

In the noise storage circuit 5512, a terminal of the resistor R2 receives a touch detection signal DET, the other terminal of the resistor R2 is coupled to a terminal of the switch SW9, and the other terminal of the switch SW9 is coupled to the negative input terminal of the operational amplifier OP1. The capacitor C4 is cascaded between the negative input terminal and the reference ground terminal GND of the operational amplifier OP1 and capable of eliminating high-frequency noise. The switch SW9 is controlled by the detection result DS1 to be turned on or turned off.

Figure 5C:
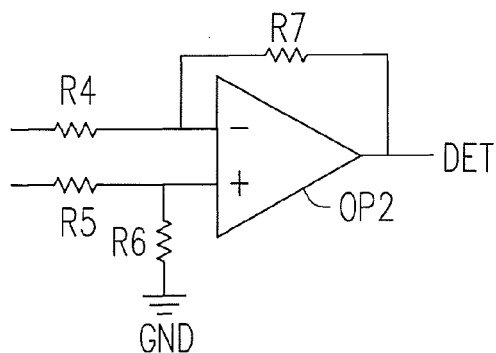
FIG. 5C is a schematic diagram illustrating a differential circuit according to another embodiment of the disclosure.

Referring to FIG. 5C hereinafter, FIG. 5C is a schematic diagram illustrating a differential circuit according to another embodiment of the disclosure. In the present embodiment, the differential circuit includes an operational amplifier OP2 and resistors R4-R7. An output terminal of the operational amplifier OP2 generates a touch detection signal DET, and a positive input terminal of the operational amplifier OP2 is coupled to the resistors R5 and R6. The resistor R5 is further coupled to a front-stage integration circuit e.g., the integration circuit 521), and the resistor R6 is further coupled to the reference ground voltage GND. The negative input terminal of the operational amplifier OP2 is coupled to the resistors R4 and R7, the resistor R7 is further coupled to the output terminal of the operational amplifier OP2, and the resistor R4 is further coupled to another front-stage integration circuit (e.g., the integration circuit 522) of the operational amplifier OP2.

Figure 6:
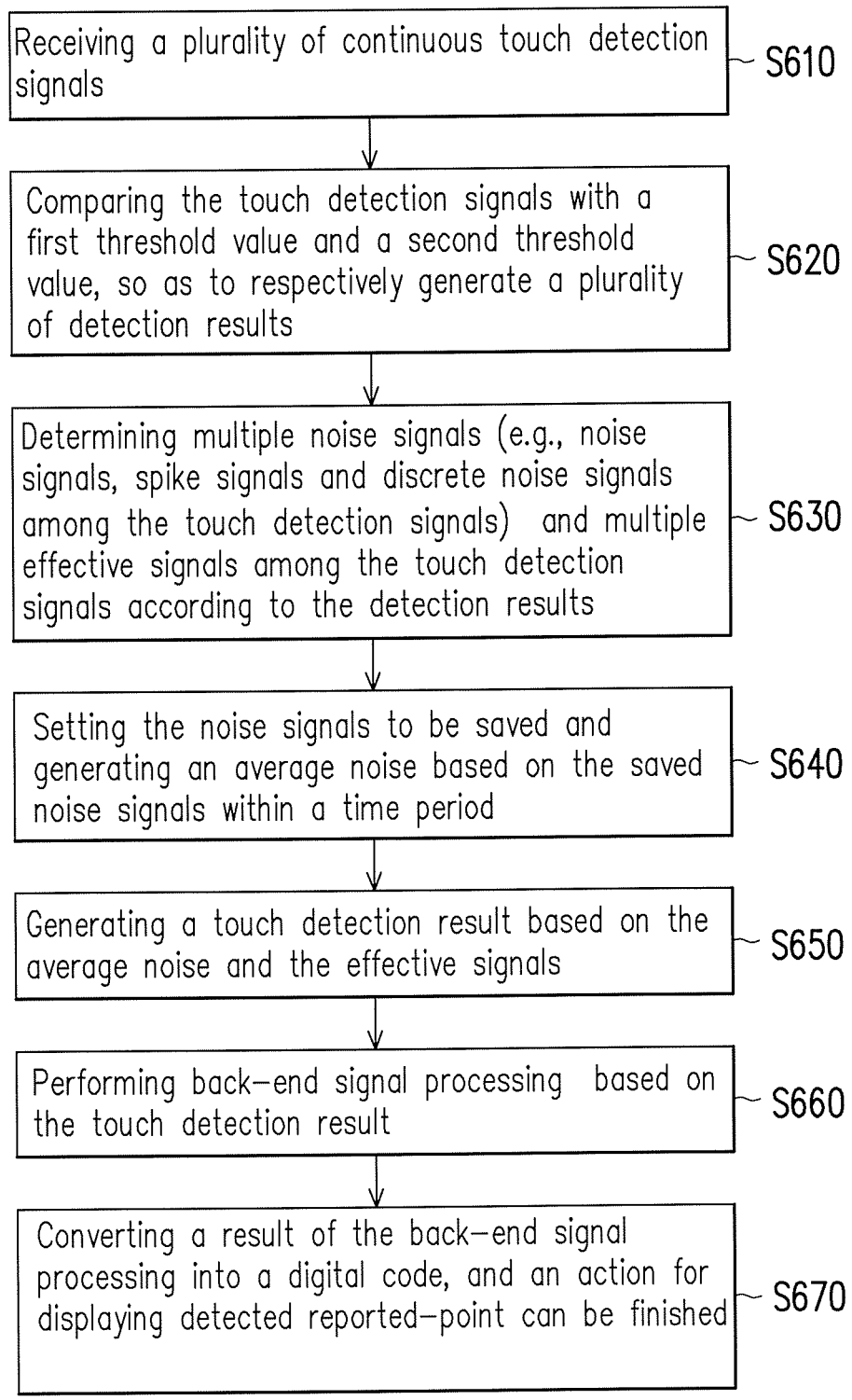
FIG. 6 is a flowchart illustrating a noise compensation method of an on-cell touch panel according to an embodiment of the disclosure.

Referring to FIG. 6 hereinafter, FIG. 6 is a flowchart illustrating a noise compensation method of an on-cell touch panel according to an embodiment of the disclosure. In step S610, a plurality of continuous touch detection signals is received. Then, in step S620, the touch detection signals are compared with a first threshold value and a second threshold value, so as to respectively generate a plurality of detection results. In step S630, a plurality of noise signals (e.g., noise signals, spike signals and discrete noise signals among the touch detection signals) and a plurality of effective signals are determined based on the detection results generated in step S620. In step S640, the touch detection signals determined as the noise signals are set to be saved within a time period, so as to generate an average noise, a controlled noise and an interval noise. In step S650, a touch detection result is generated based on the average noise and the effective signals.

It should be mentioned that after step S650, the generated touch detection result may be transmitted to a back-end circuit, in step S660, a back-end signal processing is performed based on the touch detection result. Furthermore, the step S670 is executed by converting a result of the back-end signal processing into a digital code, and an action for displaying detected reported-point can be finished.

Additionally, in other embodiments of the disclosure, the touch detection signals may be generated by the following steps. First, a plurality of capacitance change signals transmitted by one of a plurality of touch sensing lines in the on-cell touch panel and a reference signal transmitted by at least one reference signal line of the on-cell touch panel are received. Then, the touch detection signals are generated by calculating offsets between the capacitance change signals and the reference signal.

Implementation details related to the aforementioned steps can refer to the descriptions set forth in the embodiments above and thus will no longer repeated.

To summarize, in the disclosure, through the determination performed by the noise detection circuit, the noise signals are set to be saved and the average noise is generated within a fixed time period, and thereby, not only the effective signals but also the average noise are provided to the integration circuit, such that the integration circuit can generate the touch detection result based on the effective signals and the average noise to mitigate the influence caused by the noise to the detection results. Moreover, the disclosure further provides a switched capacitor integration circuit which can contribute to improving the issue of poor sensibility of the on-cell touch panel. Meanwhile, even though the embodiments of the disclosure are applied to a flexible on-cell touch panel, an electrical inhomogeneity phenomenon caused by the panel being curved can be improved through the subtraction executed by the differential circuit.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A noise compensation circuit, configured in an on-cell touch panel, comprising:
   an integration circuit;
   a noise storage circuit, coupled to the integration circuit; and
   a noise detection circuit, coupled to the integration circuit and the noise storage circuit, receiving a plurality of continuous touch detection signals, and comparing the touch detection signals with a first threshold value and a second threshold value, so as to respectively generate a plurality of detection results, wherein the noise detection circuit sets multiple noise signals among the touch detection signals to be saved in the noise storage circuit or transmits multiple effective signals among the touch detection signals to the integration circuit based on the detection results,
   wherein the noise storage circuit generates an average noise within a time period based on the noise signals and transmits the average noise to the integration circuit, and the integration circuit generates a touch detection result according to the average noise and effective signals.

2. The noise compensation circuit according to claim 1, wherein the noise detection circuit comprises:
   a first comparator, receiving the touch detection signals and the first threshold value and comparing the touch detection signals with the first threshold value to respectively generate a plurality of first comparison results;
   a second comparator, receiving the touch detection signals and the second threshold value and comparing the touch detection signals with the second threshold value to respectively generate a plurality of second comparison results; and
   a logic operation circuit, coupled to the first and the second comparators and generating the detection results respectively according to the first and the second comparison results.

3. The noise compensation circuit according to claim 2, wherein the logic operation circuit comprises:
   a first XOR gate, respectively receiving the first comparison results and the second comparison results to generate a plurality of first detection results; and
   a second XOR gate, respectively receiving the first comparison results and a plurality of inverted second comparison results to respectively generate a plurality of second detection results.

4. The noise compensation circuit according to claim 1, wherein when each of the touch detection signals is greater than the first threshold value or less than the second threshold value, each of the touch detection signals is determined as the noise signal based on the corresponding detection results and set to be saved in the noise storage circuit.

5. The noise compensation circuit according to claim 1, wherein when each of the touch detection signals is less than the first threshold value and greater than the second threshold value, each of the touch detection signals is determined as the effective signal and transmitted to the integration circuit.

6. The noise compensation circuit according to claim 1, wherein the integration circuit comprises:
   a switched capacitor circuit, comprising:
      a first switch, having a first terminal receiving the touch detection signals, and the first switch being controlled by a first clock signal;
      a second switch, having a first terminal coupled to a second terminal of the first switch, a second terminal coupled to a reference ground terminal, and the second switch being controlled by a second clock signal;
      a first capacitor, having a first terminal coupled to the first terminal of the second switch;
      a third switch, having a first terminal coupled to a second terminal of the first capacitor, a second terminal coupled to the reference ground terminal, and the third switch being controlled by the first clock signal; and a fourth switch, having a first terminal coupled to the second terminal of the first capacitor, and the fourth switch being controlled by each of the detection results;

an operational amplifier, having a negative input terminal coupled to a second terminal of the fourth switch, a positive input terminal coupled to the reference ground terminal and an output terminal generating the touch detection result;

a second capacitor, cascaded between the negative input terminal and the output terminal of the operational amplifier; and a fifth switch, cascaded between the negative input terminal and the output terminal of the operational amplifier and controlled by a third clock signal.

7. The noise compensation circuit according to claim 1, wherein the noise storage circuit comprises:

a first switch, having a first terminal receiving the touch detection signals and controlled by a first clock signal;

a second switch, having a first terminal coupled to a second terminal of the first switch, a second terminal is coupled to the reference ground terminal, and the second switch being controlled by a second clock signal;

a first capacitor, having a first terminal coupled to the first terminal of the second switch;

a third switch, having a first terminal coupled to a second terminal of the first capacitor, a second terminal coupled to the reference ground terminal, and the third switch being controlled by the first clock signal;

a fourth switch, having a first terminal coupled to second terminal of the first capacitor and controlled by each of the detection results;

a second capacitor, coupled between a second terminal of the fourth switch and the reference ground terminal; and a fifth switch, having a first terminal coupled to the second terminal of the fourth switch, a second terminal coupled to the integration circuit, and the fifth switch being controlled by an average noise transmission signal.

8. The noise compensation circuit according to claim 7, wherein the noise storage circuit further comprises:

a reset switch, coupled between the first terminal of the fifth switch and the reference ground terminal and controlled by a reset signal.

9. The noise compensation circuit according to claim 1, further comprising:

a differential circuit, coupled to the integration circuit, the noise storage circuit and the noise detection circuit, receiving at least one capacitance change signal transmitted by a touch sensing line and a reference signal transmitted by a reference signal line, and calculating an offset between the capacitance change signal and the reference signal to generate the touch detection signals.

10. A touch control apparatus, comprising:

an on-cell touch panel, comprising a plurality of touch sensing lines and at least one reference signal line;

a noise compensation circuit, coupled to the on-cell touch panel, comprising
an integration circuit, coupled to the on-cell touch panel and receiving a plurality of continuous touch detection signals;
a noise storage circuit, coupled to the integration circuit; and
a noise detection circuit, coupled to the integration circuit and the noise storage circuit, receiving the touch detection signals, and comparing the touch detection signals with a first threshold value and a second threshold value, so as to respectively generate a plurality of detection results, wherein noise detection circuit sets multiple noise signals among the touch detection signals to be saved in the noise storage circuit or transmits multiple effective signals among the touch detection signals to the integration circuit based on the detection results, wherein the noise storage circuit generates an average noise within a time period based on the noise signals and transmits the average noise to the integration circuit, and the integration circuit generates a touch detection result according to the average noise and the effective signals.

11. The touch control apparatus according to claim 10, wherein the noise compensation circuit further comprises:

a differential circuit, coupled to the touch sensing lines and the at least one reference signal line, receiving a plurality of capacitance change signals transmitted by one of the touch sensing lines and a reference signal transmitted by the at least one reference signal line, and calculating offsets between the capacitance change signals and the reference signal to generate the touch detection signals.

12. The touch control apparatus according to claim 10, wherein the noise detection circuit comprises:

a first comparator, receiving the touch detection signals and the first threshold value and comparing the touch detection signals with the first threshold value to respectively generate a plurality of first comparison results;

a second comparator, receiving the touch detection signals and the second threshold value and comparing the touch detection signals with the second threshold value to respectively generate a plurality of second comparison results; and a logic operation circuit, coupled to the first and the second comparators and generating the detection results respectively according to the first and the second comparison results.

13. The touch control apparatus according to claim 12, wherein the logic operation circuit comprises:

a first XOR gate, respectively receiving the first comparison results and the second comparison results to generate a plurality of first detection results; and a second XOR gate, respectively receiving the first comparison results and a plurality of inverted second comparison results to respectively generate a plurality of second detection results.

14. The touch control apparatus according to claim 10, wherein when each of the touch detection signals is greater than the first threshold value or less than the second threshold value, each of the touch detection signals is determined as the noise signal based on the corresponding detection results and set to be saved in the noise storage circuit.

15. The touch control apparatus according to claim 10, wherein when each of the touch detection signals is less than the first threshold value and greater than the second threshold value, each of the touch detection signals is determined as the effective signal and transmitted to the integration circuit.

16. The touch control apparatus according to claim 10, wherein the integration circuit comprises:

a switched capacitor circuit, comprising:

a first switch, having a first terminal receiving the touch detection signals, and the first switch being controlled by a first clock signal;

a second switch, having a first terminal coupled to a second terminal of the first switch, a second terminal coupled to a reference ground terminal, and the second switch being controlled by a second clock signal;

a first capacitor, having a first terminal coupled to the first terminal of the second switch;

a third switch, having a first terminal coupled to a second terminal of the first capacitor, a second terminal coupled to the reference ground terminal, and the third switch being controlled by the first clock signal; and a fourth switch, having a first terminal coupled to the second terminal of the first capacitor, and the fourth switch being controlled by each of the detection results;

an operational amplifier, having a negative input terminal coupled to a second terminal of the fourth switch, a positive input terminal coupled to the reference ground terminal and an output terminal generating the touch detection result;

a second capacitor, cascaded between the negative input terminal and the output terminal of the operational amplifier; and a fifth switch, cascaded between the negative input terminal and the output terminal of the operational amplifier and controlled by a third clock signal.

17. The touch control apparatus according to claim 10, wherein the noise storage circuit comprises:

a first switch, having a first terminal receiving the touch detection signals and controlled by a first clock signal;

a second switch, having a first terminal coupled to a second terminal of the first switch, a second terminal is coupled to the reference ground terminal, and the second switch being controlled by a second clock signal;

a first capacitor, having a first terminal coupled to the first terminal of the second switch;

a third switch, having a first terminal coupled to a second terminal of the first capacitor, a second terminal coupled to the reference ground terminal, and the third switch being controlled by the first clock signal;

a fourth switch, having a first terminal coupled to second terminal of the second capacitor and controlled by each of the detection results;

a second capacitor, coupled between a second terminal of the fourth switch and the reference ground terminal; and a fifth switch, having a first terminal coupled to the second terminal of the fourth switch, a second terminal coupled to the integration circuit, and the fifth switch being controlled by an average noise transmission signal.

18. The touch control apparatus according to claim 10, wherein the noise storage circuit further comprises:

a reset switch, coupled between the first terminal of the fifth switch and the reference ground terminal and controlled by a reset signal.

19. A noise compensation method of an on-cell touch panel, comprising:

receiving a plurality of continuous touch detection signals;

comparing the touch detection signals with a first threshold value and a second threshold value, so as to respectively generate a plurality of detection results;

determining multiple noise signals and multiple effective signals among the touch detection signals according to the detection results;

setting the noise signals to be saved and generating an average noise based on the saved noise signals within a time period; and generating a touch detection result based on the average noise and the effective signals.

20. The noise compensation method according to claim 19, further comprising:

receiving a plurality of capacitance change signals transmitted by one of a plurality of touch sensing lines in the on-cell touch panel and a reference signal transmitted by at least one reference signal line in the on-cell touch panel; and generating the touch detection signals based on offsets between the capacitance change signals and the reference signal.

* * * * *